United States Patent
Shilane et al.

(10) Patent No.: US 10,210,087 B1
(45) Date of Patent: Feb. 19, 2019

(54) REDUCING INDEX OPERATIONS IN A CACHE

(71) Applicant: EMC Corporation, Hopkinton, MA (US)

(72) Inventors: Philip N. Shilane, Yardley, PA (US); Grant R. Wallace, Pennington, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 114 days.

(21) Appl. No.: 14/674,879

(22) Filed: Mar. 31, 2015

(51) Int. Cl.
  *G06F 12/00* (2006.01)
  *G06F 12/0831* (2016.01)
  *G06F 12/12* (2016.01)

(52) U.S. Cl.
  CPC .......... *G06F 12/0833* (2013.01); *G06F 12/12* (2013.01); *G06F 2212/62* (2013.01); *G06F 2212/69* (2013.01)

(58) Field of Classification Search
  CPC .. G06F 12/0833; G06F 12/12; G06F 2212/62; G06F 2212/69
  See application file for complete search history.

(56) References Cited

U.S. PATENT DOCUMENTS

| | | | | |
|---|---|---|---|---|
| 5,581,729 A * | 12/1996 | Nishtala | G06F 12/0828 | 711/143 |
| 5,644,753 A * | 7/1997 | Ebrahim | G06F 12/0815 | 711/100 |
| 6,018,763 A * | 1/2000 | Hughes | G06F 12/0822 | 703/24 |
| 6,134,634 A * | 10/2000 | Marshall, Jr. | G06F 12/0804 | 711/141 |
| 6,295,582 B1 * | 9/2001 | Spencer | G06F 12/0804 | 710/57 |
| 6,516,386 B1 * | 2/2003 | Pang | G06F 12/1054 | 711/118 |
| 6,772,298 B2 * | 8/2004 | Khare | G06F 12/0808 | 711/120 |
| 6,782,444 B1 * | 8/2004 | Vishlitzky | G06F 12/0871 | 711/113 |
| 7,269,825 B1 * | 9/2007 | Adcock | G06F 12/1027 | 711/113 |
| 8,275,935 B2 * | 9/2012 | Suzuki | G06F 12/02 | 711/103 |
| 8,527,544 B1 * | 9/2013 | Colgrove | G06F 3/0608 | 707/791 |

(Continued)

OTHER PUBLICATIONS

Li, Cheng, et al. "Nitro: a capacity-optimized SSD cache for primary storage." 2014 USENIX Annual Technical Conference (USENIX ATC 14). 2014.*

(Continued)

*Primary Examiner* — Francisco A Grullon
(74) *Attorney, Agent, or Firm* — Workman Nydegger

(57) ABSTRACT

Systems and methods for reducing input/output operations in a computing system that uses a cache. Input/output operations associated with cache index lookups are reduced by tracking the location of the requested data such that the data can be invalidated without having to access the cache index. Input/output operations can be reduced by invalidating the entry in the cache index when reading the corresponding data.

20 Claims, 7 Drawing Sheets

(56) References Cited

U.S. PATENT DOCUMENTS

| | | | | |
|---|---|---|---|---|
| 8,688,951 | B2* | 4/2014 | Yamada | G06F 12/0815 |
| | | | | 711/118 |
| 9,390,116 | B1* | 7/2016 | Li | G06F 17/30336 |
| 2004/0199727 | A1* | 10/2004 | Narad | G06F 12/0862 |
| | | | | 711/138 |
| 2009/0172287 | A1* | 7/2009 | LeMire | G06F 12/0893 |
| | | | | 711/128 |
| 2009/0182948 | A1* | 7/2009 | Jiao | G06F 12/084 |
| | | | | 711/133 |
| 2011/0161594 | A1* | 6/2011 | Kiyota | G06F 9/3834 |
| | | | | 711/125 |
| 2012/0198174 | A1* | 8/2012 | Nellans | G06F 12/0804 |
| | | | | 711/133 |
| 2012/0221776 | A1* | 8/2012 | Yoshihashi | G06F 12/0804 |
| | | | | 711/103 |
| 2012/0239854 | A1* | 9/2012 | Hsueh | G06F 12/0866 |
| | | | | 711/103 |
| 2012/0239860 | A1* | 9/2012 | Atkisson | G06F 12/0246 |
| | | | | 711/103 |
| 2013/0067245 | A1* | 3/2013 | Horovitz | G06F 12/1408 |
| | | | | 713/193 |
| 2013/0166816 | A1* | 6/2013 | Atkisson | G06F 12/0802 |
| | | | | 711/102 |
| 2013/0185508 | A1* | 7/2013 | Talagala | G06F 12/0888 |
| | | | | 711/118 |
| 2013/0204854 | A1* | 8/2013 | Brown | G06F 3/0617 |
| | | | | 707/697 |
| 2014/0013025 | A1* | 1/2014 | Jannyavula Venkata | |
| | | | | G06F 12/0246 |
| | | | | 711/103 |
| 2014/0115251 | A1* | 4/2014 | Belluomini | G06F 12/0808 |
| | | | | 711/113 |
| 2014/0223103 | A1* | 8/2014 | Rudelic | G06F 12/084 |
| | | | | 711/130 |
| 2017/0123725 | A1* | 5/2017 | Miller, Jr. | G06F 3/0659 |

OTHER PUBLICATIONS

Mao, Bo, et al. "Read-performance optimization for deduplication-based storage systems in the cloud." ACM Transactions on Storage (TOS) 10.2 (2014): 6.*

Lu, Youyou, Jiwu Shu, and Weimin Zheng. "Extending the lifetime of flash-based storage through reducing write amplification from file systems." Presented as part of the 11th USENIX Conference on File and Storage Technologies (FAST 13). 2013.*

Saxena, Mohit, Michael M. Swift, and Yiying Zhang. "Flashtier: a lightweight, consistent and durable storage cache." Proceedings of the 7th ACM european conference on Computer Systems. ACM, 2012.*

"VNX FAST Cache", EMC, Dec. 2013.*

Krzyzanowski, Paul. "Memory Management: Paging." Rutgers University, Mar. 21, 2012.*

Costanzo, Carlo. "Enabling FAST Cache on your EMC Clariion with Flash Drives" vCloudinfo.com Nov. 18, 2010.*

Silberschatz, Abraham, and Peter Baer Galvin. "Demand Paging: Operating system concepts". Silberschatz and Galvin, 1999.*

Liu, Yang, and Wang Wei. "FLAP: Flash-aware prefetching for improving SSD-based disk cache." Journal of Networks 9.10 (2014): 2766-2775. (Year: 2014).*

\* cited by examiner

REDUCING INDEX OPERATIONS IN A CACHE

FIELD OF THE INVENTION

Embodiments of the present invention relate to systems and methods for reducing index operations in a cache when accessing data. More specifically, embodiments of the invention relate to reducing index I/O (Input/Output) operations in a cache such as a flash cache.

BACKGROUND

The performance of a storage system can be improved with the addition of a cache. Flash caches such as solid-state drives (SSDs) can be incorporated into storage systems and can be quite large. Data stored in the cache is accessed using a cache index, which identifies the location of data in the cache. Because the flash cache may be large, the cache index may need to be stored in the flash cache itself because the cache index may be too large to fit in memory (e.g., RAM).

When the cache index is stored in the flash cache, accessing data in the flash cache becomes more expensive at least in terms of I/O operations. Because the cache index is stored in the flash cache, accessing the cache index is equivalent to accessing the flash cache. The number of I/O operations to the flash therefore increase because any request to access data stored in the cache usually requires that the cache index be accessed first. If each data access requires a corresponding cache index lookup, the flash cache is effectively accessed at least twice for each read operation. Even though a flash cache can be fast, the response time of the flash cache is affected.

In general, there are various operations in which it is necessary to access the cache index or perform a cache index lookup. Read, write, and inquiry operations are examples of operations that are associated with cache index lookups. In addition, cache index updates are also expensive operations at least in terms of I/O, and also in terms of media longevity, because a cache index update requires both an erasure operation and a write operation. Systems and methods are needed to improve the performance of a flash cache and to reduce or minimize cache index lookup operations.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
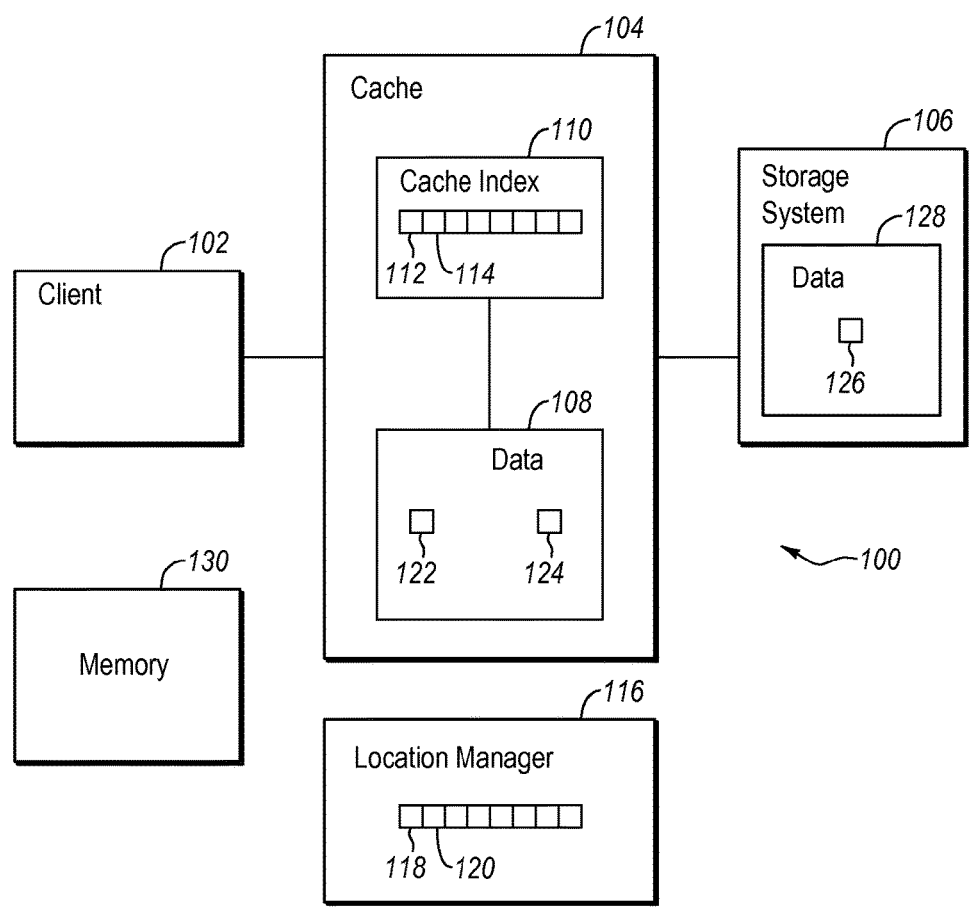
FIG. 1 illustrates an example of a computing system in which index lookup operations can be reduced or minimized.

Embodiments of the invention generally relate to reducing index input/outputs (I/Os). Embodiments of the invention further relate to reducing index I/Os when performing read operations, write operations, modify operations, or the like. Embodiments further relate to minimizing the number of times that a cache index of a flash cache is accessed during operations including read operations, write operations, and modify operations.

Embodiments of the invention can be implemented in a computing environment that includes, by way of example, one or more clients, at least one cache, and at least one storage system that includes one or more storage devices. The clients can include any device that can interact with the cache and/or the storage system. Example clients include, but are not limited to, smartphones or other cellular devices, tablet devices, laptop computers, desktop computers, server computers or the like. The communications between the clients, cache and storage system can occur over direct connections or network connections or multi-network connections and can include wireless connections and/or wired connections. The computing systems can vary in size and complexity and may include, but are not limited to, a single device, a high availability system, a local area network, a datacenter, the Internet, or the like or any combination thereof.

In one example, the storage system includes hard disk drives (HDDs). The cache may include a faster storage device such as a solid-state drive (SSD) as a flash cache. Using SSDs as a caching layer dramatically increases the amount of data that can be cached. An SSD flash cache can be very large and can store a significant portion of the underlying storage system. By way of example, the SSD cache may have a capacity equal to 5-10% of the storage system. The capacity of the cache is not limited to this range however and can be smaller or larger.

A large cache, however, also requires a large cache index to track what segments or data are in the cache and where the segments (or data) are located in the cache. For large caches the cache index may not fit in memory economically and may be either partially or wholly kept on storage media such as within the flash cache itself. As a result, looking up a segment or data in the cache index can be expensive in terms of I/Os because of the associated queries to the index and subsequent queries for the data once the location is determined from the cache index lookup. In some embodiments, there may be multiple indexes within the flash cache that must be queried to determine whether a segment or data is located in the cache and its location. Embodiments of the invention reduce the number of times that the cache index is accessed and can improve the performance of the flash cache.

For example, in a de-duplicated cache, the cache index is queried for several different reasons. De-duplication means that only unique data is stored, though there may be multiple references to a data item or segment. The cache index may be queried when there is a request for data from a client. The cache index may also be queried when there is an insertion request to ensure that a duplicate copy of the data is not inserted into the cache. The cache index may also be queried when a segment or data is invalidated from the cache.

For some operations, the same segment or data may be queried within a short period of time to complete the client request. For example, a read-modify-write request will query both the cache index and the cache to read the data and then query the cache index to invalidate the overwritten data (which was just read). There may be additional operations when the new data is written to the flash cache and the location of the new data is added to the cache index.

Embodiments of the invention preserve the location information or cache index information during an operation. As a result, the second query to the cache index is not necessary because the location information is preserved.

Similarly, for read requests, the returned data may be cached at a higher level cache (such as a memory buffer cache). When this data is evicted from the memory buffer cache, an attempt may be made to insert the data back into the lower level cache (e.g., the flash cache). This reinsertion attempt would require a cache index lookup. However, this cache index lookup can be avoided by providing some hints as to the origin of the data, for example whether the data came from the flash cache or the storage system. In this way, a second cache index lookup is avoided if the origin was from the flash cache and the data is assumed to still reside in the cache.

Embodiments of the invention reduce the number of index queries for at least these scenarios where data may be read and shortly after either invalidated or re-inserted. In one embodiment, meta-data such as location data (potentially opaque to the client) is included with the returned data and the location data indicates the origin or location of the data in some embodiments. The location data can be used when writing back to the cache or when inserting or re-inserting the data into the cache. This allows for optimizations by avoiding a cache index lookup.

In some examples, a segment or data in the cache may be invalidated. Marking a segment or data as invalid indicates that the segment or data is not a valid response to subsequent queries for the data. Segments or data may be invalidated because the segment or data is deleted, the corresponding file/LUN position is overwritten, the age of the segment or data has passed a threshold, or the like. There may be situations, however, where the old data is retained in addition to any modified data that may be written to the cache.

For client calls requesting to invalidate a segment in the cache, the location data or other meta-data (indicating a segment location from a previous index lookup or, in other words a data location) would be used to mark an in-memory data structure, for example a location manager such as a bitmap, to indicate that the segment is invalid. In this example, a location manager has a bit for each entry in the cache. Other data structures besides a bitmap may serve the same purpose. The location manager is used to record this information since updating the cache index in the flash cache may take place in an offline manner with some delay between invalidation operations and updates to the cache index. This process does not incur additional I/O to the cache index because the location manager is in-memory and invalidated segments are batched for cleaning later.

After reading a segment from the cache, in previous implementations, the client may not have a mechanism to track where the data came from, and the client may attempt to reinsert the segment into the cache. In this example, the location data indicating segment location would allow a quick in-memory check to validate that that container or data is still available on cache. If the container or data is still available, then no cache index query or reinsertion is necessary.

In another example, the request for data is implemented as a read-and-invalidate call to the cache. The segment data would be queried and returned to the client. At the same time, the cached copy would be invalidated, for example by marking a corresponding entry in a location manager. Subsequent requests for that segment would miss in the cache. The read-and-invalidate call could be made for read-modify-write operations to prevent a second call to the cache to invalidate the old version of the segment or data. In another example, a small in-memory cache of recently read index entries is maintained and can be used in these situations In a read-modify-write context, the newly modified data or segment is written to the cache. The location of the newly modified segment is added to the cache index immediately or in an offline manner. Additions to the cache can be batched, for example.

FIG. 1 illustrates an example of a computing system in which embodiments of the invention may be implemented. FIG. 1 illustrates a client 102 that can communicate with a cache 104 and a storage system 106. The storage system stores data 128. The cache 104 may be a flash cache (e.g., an SSD) and may be an intermediary storage between the storage system 106 and the client 102. The cache 104 is typically faster and smaller than the storage system 106. The cache 104 stores data 108 and a cache index 110. In other words, the cache index 110 is maintained in the flash cache 104 itself in one embodiment. In one example, the data 108 stored in the cache 104 includes data that has been recently used or accessed by the client 102 or that is frequently used by the client 102, or the like. The data may be located in the cache using a key or other appropriate manner.

The cache index 110 references the data 108 stored in the cache. For example, the entry 112 identifies at least a location of the data 122 in the cache 104 and the entry 114 identifies at least a location of the data 124. The manner in which the location is identified can depend on how the data is stored and on the structure of the cache or the format of the cache. An entry in the index 110 may alternatively identify a location of the data 126 stored in the storage system 128. In another example, an entry in the cache index 110 may identify the location of data in both the cache 104 and in the storage system 106.

When the client 102 issues a lookup request to the cache 104, a key may be provided and the cache index 110 is checked first using the key. The key may be, by way of example, a hash, a file and an offset, a logical unit number and a logical block address, an object identifier, or other identifier that can be used to identify the location of the data in the cache corresponding to the key.

In one example, entries in the cache index 110 are updated in a batch process where multiple entries are updated during the same process. For example, a group of invalid entries may be cleaned at the same time. An entry in the cache index 110 needs to be updated, for example, when the corresponding data is invalidated. Data can become invalidated for many reasons, including but not limited to, overwrites, file deletions, cache evictions, data corruption, hardware failures, cache shrink operations, time or the like or combinations thereof.

Because the cache index 110 may be updated during a batch process, it may be necessary to identify locations in the cache 104 and/or in the cache index 110 that are no longer valid. In one example, a location manager 116 may be used to track which entries in the cache index 104 are invalid. In one example, the location manager 116 is maintained in a memory (e.g., RAM) 130. The memory 130 may be associated with the storage system 106 and/or the cache 104. In one example, the memory 130 may reside on the client 102. Each entry in the location manager may correspond to an entry in the cache index 110. For example, the entries 118 and 120 in the location manager 116 may correspond to the entries 112 and 114 in the cache index 110. In effect, entries in the location manager 116 also correspond to locations of the data 108.

In one example, each entry in the location manager 116 may be a single bit. A 0 may represent a valid entry and a 1 may represent an invalid entry. When data is invalidated, the corresponding entry in the location manager 116 is set to a 1 in this example. Other data structures may be used as the location manager 116 to track the entries in the cache index 110. In some embodiments, entries in the location manager 116 may include additional information about the entries or the corresponding data.

In one example, one or more of the cache 104, the memory 130, and the storage system 106 may be part of a server computer or part of a plurality of servers or a server system that is configured to serve client requests. Such a server system may be a file server, a database server, an email server, a backup server, or the like. Thus, the memory 130 is included in the server computer and the location manager 116 may be maintained in the memory 130. The memory 130 may be RAM or another memory buffer.

Figure 2:
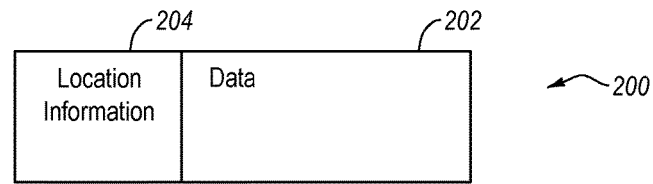
FIG. 2 illustrates an example of a block that is returned in response to a cache access operation and that includes location information in addition to the requested data.

FIG. 2 illustrates an example of a block returned in response to an access operation or a cache index lookup. Embodiments of the invention can reduce the number of cache index lookups in one example with a block 200. The block 200 includes, in one example, data 202 and location information 204. The data 202 corresponds to the data in the cache that was requested by the client.

The location information 204 includes information about the data 202. The metadata included in the location information 204 can vary in size from a single bit to a larger structure. The size of the location information 204, however may affect the information conveyed by the location information 204. In one example, the location information 204 identifies where the data is stored. The location can be as general as the cache or the storage system. The location can be more specific and specify the exact location of the data in the cache or the storage system.

By way of example, the location information 204 may include an origin of the data 202 (e.g., the flash cache, the storage system, or the like), a container identifier (an identifier that can be used to address the location manager in memory), a block identifier (a physical identifier from which data can be read), a block ordinal position (a position inside the container), a block byte offset (an offset inside the container), and/or a cache generation identifier. The container identifier, block identifier, block ordinal position, and block byte offset may specify a precise position in memory or in the cache. One or more of the foregoing examples can be included in the location information. The location information is not limited to this information however.

The cache generation identifier may relate to cache generations. A cache can ensure that data is valid for a certain number of generations. Thus, the cache generation identifier can be used to determine whether the data is still in the cache when the current cache iteration is in an appropriate range.

In a conventional system, for example, a read-write-modify operation requires at least two cache index lookups. For example, the client may read from the cache. This requires a first cache index lookup to determine in the data is stored in the cache. In one example, more than one entry in the cache index may be checked. The data is then returned to the client by reading the data from the location indicated by the cache index. The client may then modify the data.

After the data is modified, the client may write the new or modified data to the cache. However, a request to invalidate the previous version of the data is necessary in this case and this requires a second cache index lookup to invalidate the old entry of the data. As a result, the cache index is read multiple times in read-modify-write operations. A similar issue arises when inserting previously read data that may have been stored in RAM or other memory.

Figure 3:
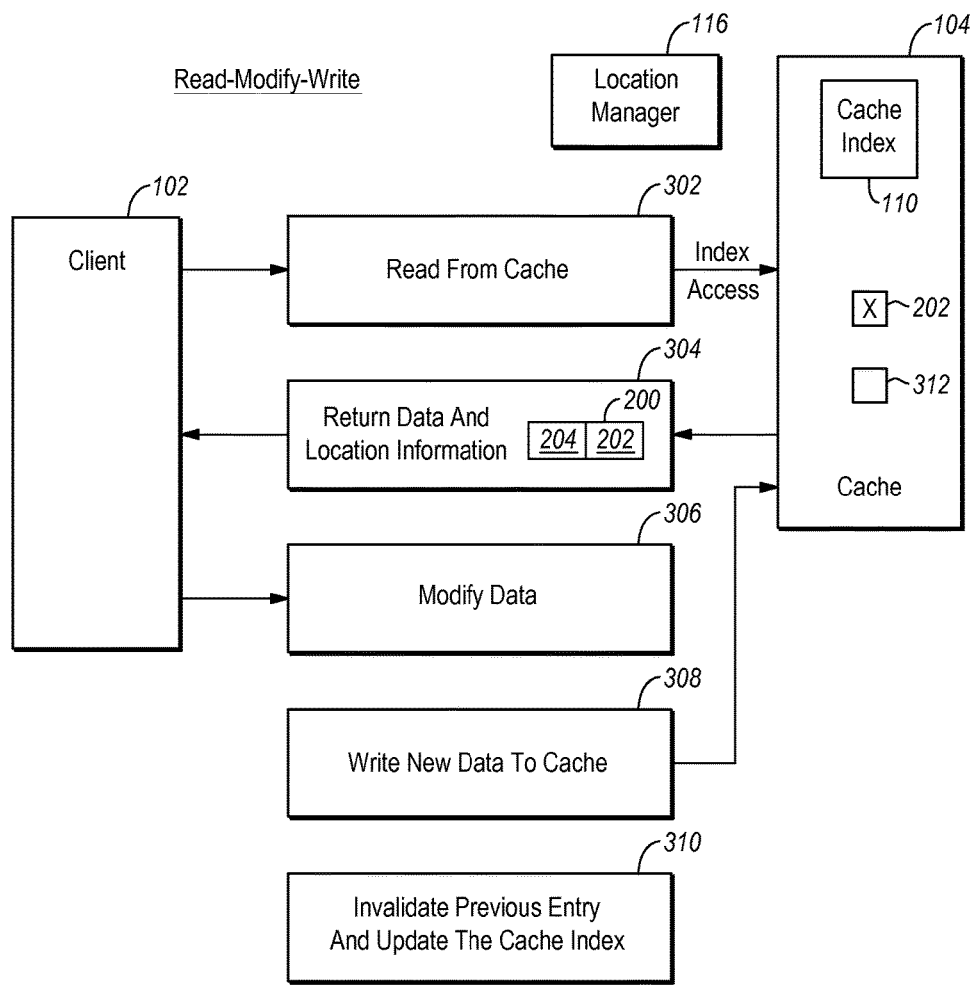
FIG. 3 illustrates an example of systems and methods for performing read-modify-write operations while reducing or minimize cache index lookups.

FIG. 3 illustrates an example of a method for performing a read-modify-write operation while reducing or minimizing cache index lookups. In box 302, the cache is read is response to a request from a client 102. The request may identify or include a key in one example. Reading the cache 104, however, requires an index access or an index lookup operation to determine a location of the requested data.

In box 304, a block 200 is returned to the client. The box 200 includes the requested data 202 (which may have been read from the cache 104 or from the storage system 106.). The block 200 also includes location information 204 about the requested data.

The location information 204 may be opaque from the perspective of the client 102. The location information 204 may provide an indication as to the origin of the data 202. The specificity of the location information 204 can vary. The location information 204 may be a single bit (Boolean) that identifies its origin as the cache 104 or the storage system 106. The location information 106 may, however, be more robust and include information similar to that maintained in the cache index 110. Other variations are also possible. The client 102 may keep the location information 204 in memory. The location information 204 may be a copy of at least some of the location information that was stored in the entry of the cache index 110 associated with the requested data.

In box 306, the data 202 may be modified by the client 102. After the data 202 has been modified by the client 102, the new data may be written to the cache 104 as data 312 in box 308.

In box 310, the data 202 is invalidated because the new or modified data is now being written to the cache 104. The old data 202 can be invalidated, in one example, by making an appropriate change in the location manager 116, which may be stored in memory 130 of the server in one example. Because the location information 204 has been retained during the read-modify-write operation, the location of the data 202 can be invalidated without having to access the cache index 110. In other words, the location information 202 allows the data 202 or the location of the data 202 to be invalidated because the location is known from the location information. The corresponding entry in the cache index 110 is also known and may be cleaned immediately or at another time.

In another example, the location information 204 identifies an entry in the cache index 110. The data 202 can be invalidated by marking the corresponding entry in the location manager 116 that corresponds to the entry in the cache index 110 associated with the data 202. Thus, the data 202 can be marked as invalid in the location manager 116 without having to access the cache index to find the location of the data 202. Advantageously, a cache index lookup is avoided in this example and the data can be effectively invalidated without performing a cache index lookup. The cleanup process can be performed in a batch process at a later time if desired.

Figure 4:
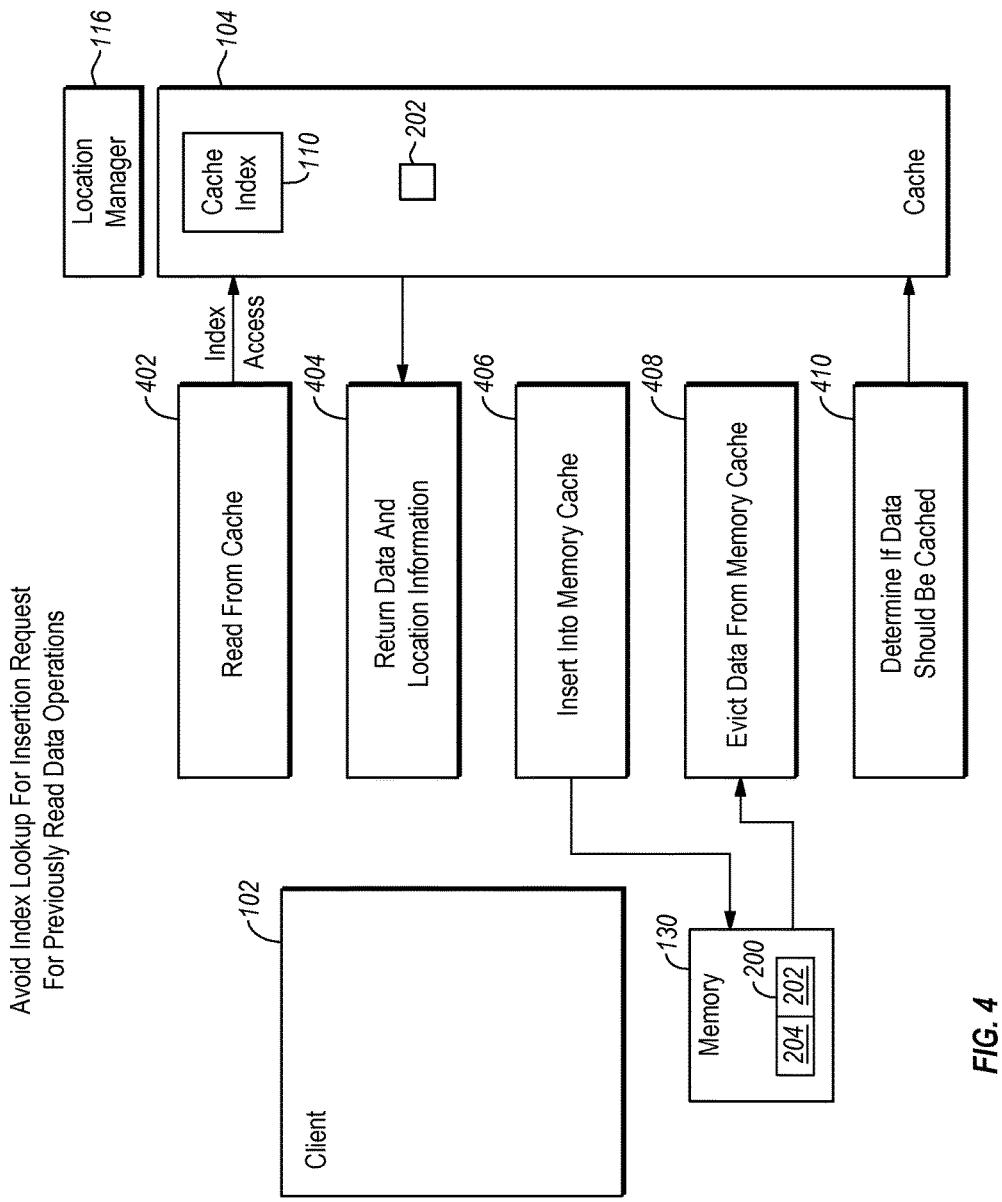
FIG. 4 illustrates an example of systems and methods for re-inserting previously read data into a cache while minimizing or reducing cache index lookups.

FIG. 4 illustrates an example of a method for efficiently determining whether to insert previously read data into a cache. In box 402, a request for data is made by the client 102. Accessing the cache 104 for the requested data 202 requires a cache index lookup in the cache index 110. As previously stated, a key may be used to access the cache index 110 and identify the location of the data 202. The data 202 is then returned to the client 102 in box 404 as the block 200.

In box 406, the block 200 is inserted into the memory 130, which is an example of another cache level. The block 200 and thus the data 202 may remain in the memory 130 for a period of time. In box 408, the data 202 is removed from the memory 130. For example, the data 202 may be evicted from the memory 130.

In box 410 a determination is made as to whether the data 202 should be reinserted into the cache 104. In this example, the location information 204 could be a Boolean value that identifies the origin of the data 202. In another example, the location information 204 may include metadata that allows the location manager 116 to be checked to see if the data is still cached. In another example, additional information such as the container ID and the like may be required. This information can be compared with the corresponding entry in the location manager 116. If the location manager 116 indicates that the location is still valid and the location information identifies the cache as the origin of the data, then the data is not inserted into the cache 104. If the location manager 116 indicates that the location is invalid, then the data is written to the cache.

Thus, the location information 204 can be used to determine if the data 202 should be inserted back into the cache 104. When the location information 204 indicates, in one example, that the data 202 originated from the cache and it is determined that the data 202 in the cache is still valid, the data 202 is not inserted because the data 202 is already in the cache. This avoids an index lookup to determine if the data is still cached and avoids inserting duplicate data in the cache 104.

It is possible that while the data 202 is stored in the memory, the corresponding data 202 in the cache 104 may be evicted. In this example, the location information 204 may include a location value. With this value, the location manager 116 can be checked determine whether the location is still valid or whether the data is still located in the cache 104. If the data is not in the cache, then a determination may be made to insert the data 202 back into the cache 104.

If the data 202 is modified by the client 102, then the corresponding entry in the location manager can be marked as invalid and the method may proceed as previously described.

Figure 5:
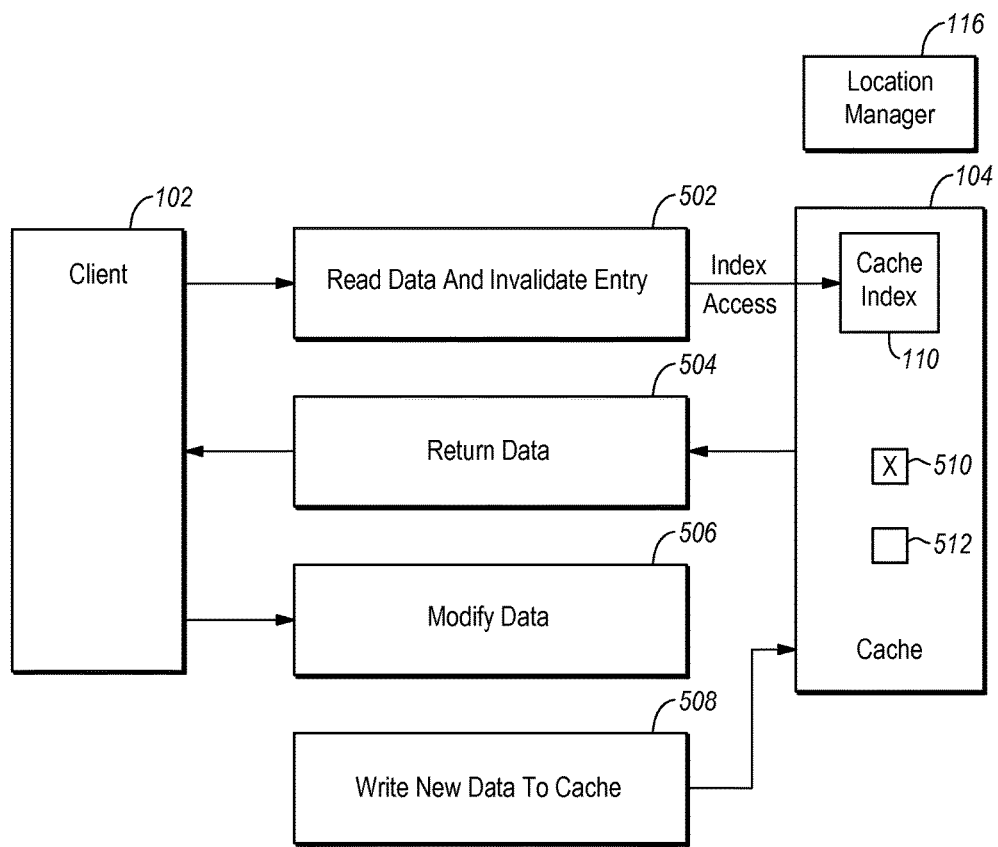
FIG. 5 illustrates an example of systems and methods for avoiding index lookups by invalidating entries in a cache when the data is read.

FIG. 5 illustrates an example of a method for avoiding index lookups by invalidating entries in a cache when the data is read. In box 502, a request is made to access data 510 in the cache 104. At the same time, an entry in the location manager 116 is changed to reflect that the data 510 is considered to be invalid. The valid data is returned to the client in box 504. In box 506, the data 510 is modified. In box 508, the new data is written to the cache 104 as the data 512. The cache index 110 may be changed to reflect the new data. In one example, the write performed in box 508 does not need to invalidate the previous version which would require another cache index lookup. For example when the cache index key is a content defined hash, the index keys of the data 510 and the data 512 will be dramatically different and would require looking up in different locations of the index.

Figure 6:
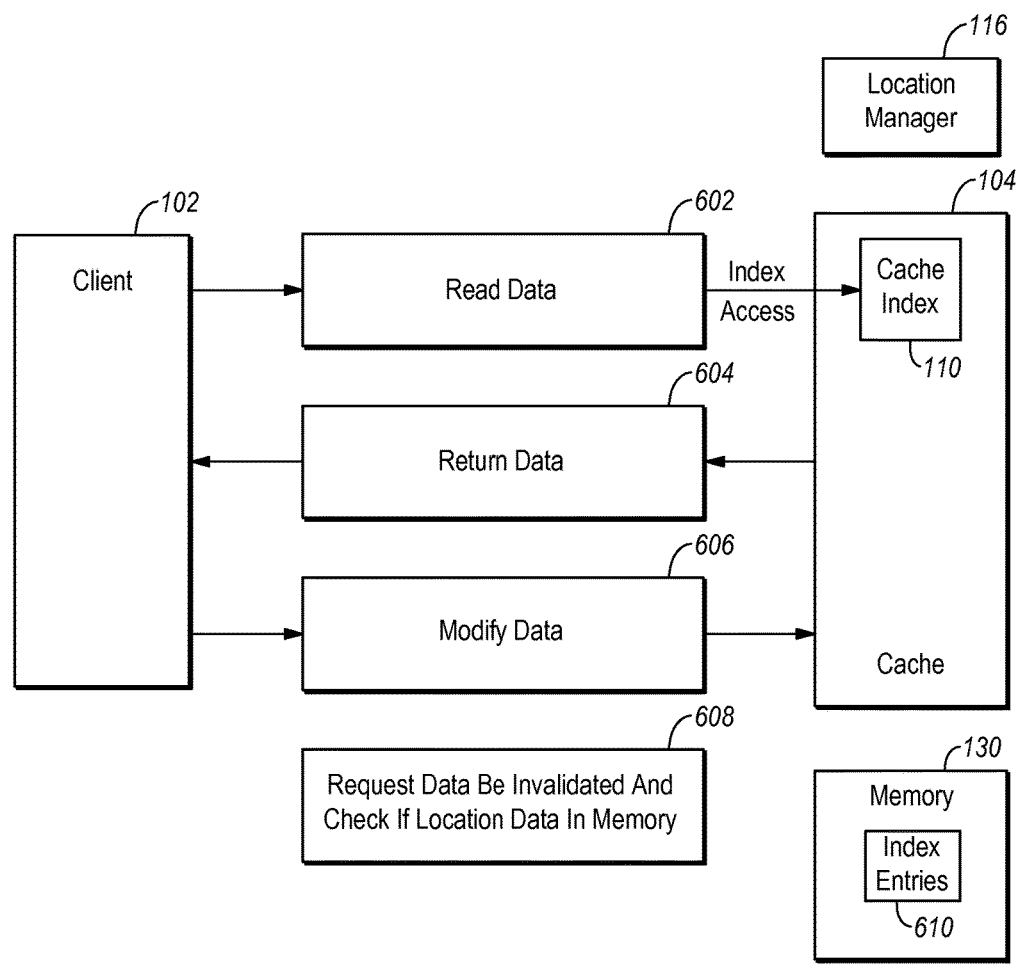
FIG. 6 illustrates another example of systems and methods for reducing cache index lookups.

FIG. 6 illustrates another example for reducing cache index lookups. In box 602, data is read from the cache 104. The read operation requires a cache index lookup as previously described. In box 604, the data is returned to the client 102. A block 200 may be returned that includes location information. The data is modified in box 606.

FIG. 6 also illustrates that a cache of index entries 610 may be maintained in the memory 130 of the server (or in another location or memory). The cache of index entries 610 may include a cache of, for example, the location information associated with recently accessed data. When the data is written to the cache 104 after having been modified, the cache of index entries can be checked for the location information. By keeping recent index entries in the memory, a cache index lookup operation can be avoided. Rather, the location information stored in the cache of index entries 610 can be used to determine how to handle the data being written to the cache. For example, if the location information of the data is in the index entries 610, then the new data is written to the cache and the appropriate entry in the location manager 116 for the old version of the data can be marked as invalid based on the location information maintained in the cache of index entries 610 in the memory 130

The foregoing discussion thus illustrates that cache index lookups or cache index access operations can be reduced. In one example, location information is returned with the data such that the location information can be tracked. More specifically, the location information can be used to access the location manager to mark a particular entry, which corresponds to data in the cache or to a location in the cache, as invalid.

In another example, the entry in the location manager can be marked as invalid when the read operation is performed. In this example, it may not be necessary to return location information with the data because the appropriate entry in the location manager has already been marked as invalid.

In another example, a cache of recent cache index entries that were looked up is maintained in memory other than the cache and different from the location manager. When the data is written, the cache of recent index entries can be used to invalidate the entry in the location manager instead of performing a cache index lookup. Embodiments of the invention, as discussed herein, thus relate to systems and methods for accessing a cache that is associated with a storage system.

Figure 7:
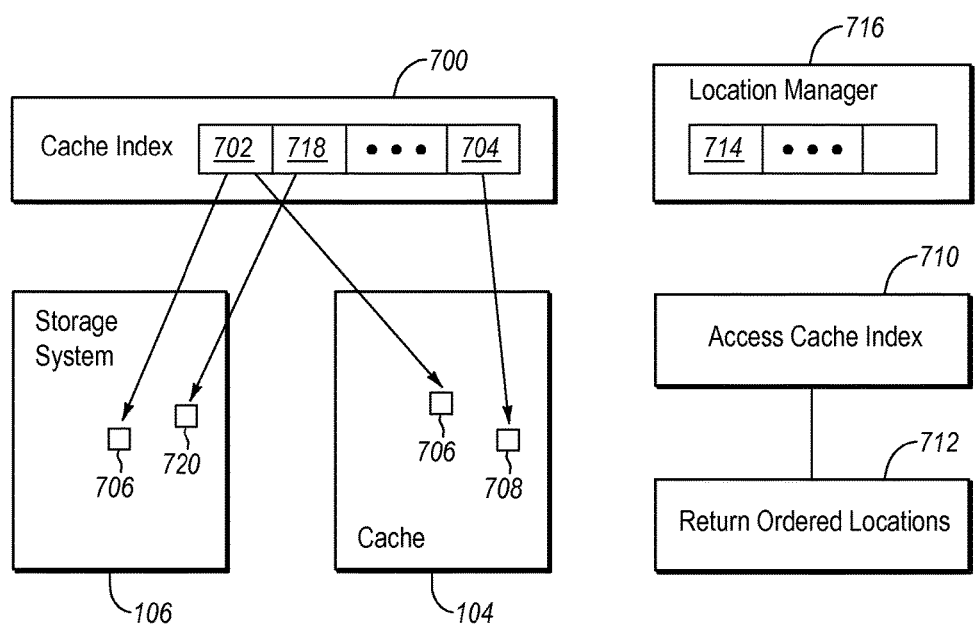
FIG. 7 illustrates another example of a cache index.

FIG. 7 illustrates another example of a cache index. In FIG. 7, the cache index 700 includes entries that may be associated with more than one location. The entry 702, for example, is associated with the data 706 in the cache 104 and with the data 706 in the storage system 106. The entry 704 may only include a location of the data 708 in the cache 104. The entry 718 may identify a location of the data 720, which may only be present in the storage system 106.

The location manager 716 may be similarly configured. The entry 714 may also correspond to the data 706 in both the cache 104 and the storage system 106. During a read-modify-write operation, the appropriate locations in the location manager 714 can be marked as invalid. The location manager 716 is thus configured to handle multiple locations in each entry. When the location manager 716 is marked to invalidate the data in the cache, the entry for the copy of the data in storage may remain valid.

In a conventional system, there is an index for the cache and a separate index for the storage system. When responding to a read request, the cache index is checked first. If the cache index misses, the storage index is checked. In contrast, a cache index 700 can include more than one location in each entry and allows the location of data to be identified from a single cache index lookup operation instead of two index lookup operations.

When the cache index 700 identifies more than one location for the requested data, a process may then be performed to determine which copy of the data should be returned. There may be reasons to prefer one location over another location and a cost function, for example, may be used to determine which location to use when responding to a request for data. The locations may include, by way of example only, both caches and tiers of storage. For example data could be stored in a local storage system, or in a local cache, or in a remote storage system, or a remote cache. Remote storage systems could include cloud storage. Data can be stored on different types of media, some being faster to access, some being more expensive to use.

This is basically described in FIG. 7. An index lookup operation may include a cache index lookup in box 710. The cache index may identify more than one location for the requested data and a decision is made with respect to which location is used. In box 712, the results are returned.

More specifically, when more than one location is present in the cache index 700, the locations may be ordered according to some property. For example, the locations may be ordered based on expected access time, where data stored in locations with faster expected access times are returned before data stored in locations with slower expected access times. Another property to consider is the financial cost of accessing data. Some storage systems charge for accesses, such as cloud storage providers, so accesses that are less expensive may be preferred. Alternatively, a single location may be returned based on the same property.

When a read-modify-write operation is performed, the number of I/Os can be reduced and the appropriate one or more entries in the location manager 714 can be marked as invalid.

Figure 8:
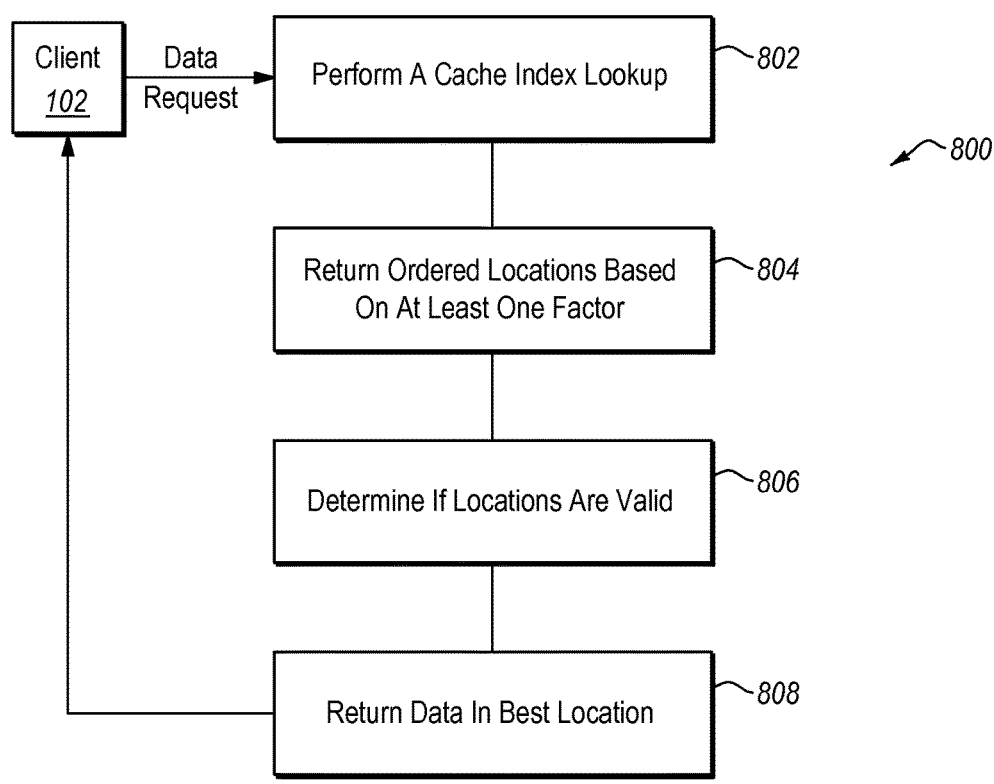
FIG. 8 is a flow diagram for accessing data in the context of performing a cache index lookup.

FIG. 8 illustrates an example of a method 800 for returning data in response to a request for the data. When the client 102 makes a data request, a cache index lookup is performed in box 802. In this example, the entries in the cache index (e.g., the cache index 700) may identify more than one location for the requested data. In box 804, the locations are ordered. In box 804, the locations may be ordered based on at least one factor. Example factors include those previously mentioned such as expected access time, financial cost, and validity of location. Other factors may include the urgency of the request, the status of the requestor, or the like.

In box 806, a determination is made as to whether the locations are valid. This may include referencing the location manager 716. The location manager may also represent multiple locations per entry. In box 808, the data in the best location (e.g., first in the ordered results) is returned to the client 102.

For example, if the cache index includes two locations for a requested data, the method 800 may determine that the location in the cache should be returned because the cache provides faster access and because there is no cost associated with returning the data from the cache. If the data in the cache is valid, the data can be returned to the client. If the copy in the cache is determined to be invalid, then the next location in the ordered results is used. In this case, the data may be returned from the storage system.

In one example, the validity of the locations may be determined before the ordered locations are determined or ordered. Thus, the validity of the locations is another factor that can be used when ordering the locations.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a storage system and a cache associated with the storage system, a method for accessing the cache, the method comprising:
    accessing a cache index to determine a location of data that is stored in the cache in response to a request from a client, wherein the cache index is stored in the cache;
    returning a block in response to the request, wherein the block includes the requested data and location information, wherein the location information returned in the block is stored in an entry of a location manager, which is stored in a memory that is separate from the cache;
    writing new data to the cache, wherein the new data corresponds to a modified version of the requested data;
    invalidating the requested data in the cache without accessing the cache index in the cache by changing the entry in the location manager corresponding to an entry in the cache index to indicate that the requested data in the cache is invalid, and
    batch cleaning the cache index, which includes updating multiple entries in the cache index corresponding to multiple entries in the location manager that identify invalidated data.

2. The method of claim 1, further comprising receiving a read request from the client.

3. The method of claim 1, wherein invalidating the requested data includes marking the entry in the location manager that is stored in a memory separate from the cache, wherein entries in the location manager correspond to entries in the cache index.

4. The method of claim 1, wherein the cache index is stored in the cache.

5. The method of claim 1, wherein the location information includes at least some of the same information stored in the cache index for the requested data.

6. The method of claim 1, wherein the location information is opaque to the client.

7. The method of claim 1, wherein accessing a cache index includes providing a key associated with the requested data.

8. The method of claim 1, wherein invalidating requested data occurs at or about the same time as accessing the cache index to determine the location of the data.

9. In a system that includes a cache associated with a storage system, a method for accessing the cache, the method comprising:
    accessing a cache index to determine a location of data that is stored in the cache in response to a request from a client, wherein the cache index is stored in the cache;
    returning a block in response to the request, wherein the block includes the requested data and location information;
    inserting the block into a location manager stored in a memory that is separate from the cache;
    determining whether the data should be inserted back into the cache when the data is removed from the location manager without accessing the cache index in the cache, based on the location manager, wherein the location information allows the location manager to determine an origin of the requested data and to determine whether the requested data is still valid, wherein the data is not inserted back into the cache when the location manager indicates that the requested data is still valid and the origin of the requested data is the cache, wherein entries in the location manager correspond to entries in the cache index; and
    when the requested data is invalid, invalidating the requested data in the cache without accessing the cache by changing an entry associated with the requested data in the location manager.

10. The method of claim 9, wherein the requested data is not modified by the client.

11. The method of claim 9, wherein the location information identifies a source of the data.

12. The method of claim 11, further comprising inserting the data into the cache when the source is the cache and the data in the cache is invalid.

13. The method of claim 11, wherein the data is not inserted into the cache if the data is still in the cache and still valid.

14. The method of claim 9, further comprising invalidating the data if the data is modified and inserting the modified data into the cache.

15. The method of claim 9, wherein the location information is opaque to the client.

16. The method of claim 9, wherein accessing a cache index includes providing a key associated with the requested data.

17. The method of claim 9, further comprising:
    writing new data to the cache, wherein the new data corresponds to a modified version of the requested data; and
    invalidating the requested data in the cache without accessing the cache index based on the location information included in the block.

18. In a system that includes a storage system and a flash cache associated with the storage system, a method for accessing the flash cache, the method comprising:
    accessing a cache index to determine a location of data that is stored in the flash cache in response to a request from a client, wherein the cache index is stored in the flash cache;
    returning location information of the requested data and the requested data to the client;
    storing the location information in a cache of index entries maintained in a memory of the client, wherein the memory is separate from the cache;
    writing modified data to the flash cache;
    invalidating the requested data in the flash cache without accessing the cache index in the cache by changing an entry associated with the requested data in the cache of index entries to indicate that the requested data in the cache is invalid, wherein entries in the cache of index entries correspond to entries in the cache index; and batch cleaning the cache index, which includes updating multiple entries in the cache index corresponding to multiple entries in the location manager that identify invalidated data.

19. The method of claim 18, further comprising determining whether the location information for the data is stored in the cache of index entries when invalidating the requested data.

20. The method of claim 18, further comprising invalidating the requested data by marking the entry in a location manager, wherein each entry in the location manager corresponds to an entry in the cache index and to data stored in the flash cache.

* * * * *